United States Patent [19]

Jester et al.

[11] Patent Number: 5,529,740
[45] Date of Patent: Jun. 25, 1996

[54] PROCESS FOR TREATING LIQUID CRYSTAL POLYMER FILM

[76] Inventors: Randy D. Jester, 1795 Lake Cunningham Rd., Greer, S.C. 29651; John A. Penoyer, 106 Strubridge Dr., Greenville, S.C. 29615; Douglas D. Roth, 604 Pack Mountain Ridge Rd., Taylors, S.C. 29687; Detlef Frank, Karolinger Strasse 19, D-6500 Mainz 43, Germany; Minoru Onodera, 17-1, Tsurajima 1-chome, Kurashiki-city, Okayama, Japan; Takeichi Tsudaka, 1229-1, Ouchi, Kurashiki-city, Okayama, Japan; Toshiaki Sato, 1660, Sakazu, Kurashiki-city, Okayama, Japan; Tohei Moritani, 16-6, Machikaneyamacho, Toyonaka-city, Osaka, Japan

[21] Appl. No.: 307,993

[22] Filed: Sep. 16, 1994

[51] Int. Cl.$^6$ .......................... B29C 33/52; B29C 71/02
[52] U.S. Cl. ........................... 264/317; 264/341; 264/345
[58] Field of Search ..................... 264/216, 234, 264/316, 317, 341, 345, 348

[56] References Cited

U.S. PATENT DOCUMENTS

| | | | |
|---|---|---|---|
| 4,247,514 | 1/1981 | Luise | 264/345 |
| 4,333,907 | 6/1982 | Urasaki et al. | 264/290.2 |
| 4,717,624 | 1/1988 | Ikenaga et al. | 428/423.1 |
| 5,053,481 | 10/1991 | Ishii et al. | 528/206 |
| 5,227,115 | 7/1993 | Harnischfeger . | |

FOREIGN PATENT DOCUMENTS

| | | |
|---|---|---|
| 445674 | 9/1991 | European Pat. Off. . |
| 2-252738 | 10/1990 | Japan . |
| 3-23921 | 1/1991 | Japan . |
| 4-53739 | 2/1992 | Japan . |
| 4-62144 | 2/1992 | Japan . |
| 4-136038 | 5/1992 | Japan . |
| 4-166323 | 6/1992 | Japan . |

OTHER PUBLICATIONS

Database WPI, Section Ch, Week 9230, Derwent Publications Ltd., London, GB; Class A23, AN 92–247278 & JP,A,04 168 129 Uunitaka Ltd), 16 Jun. 1992.

Database WPI, Section Ch, Week 8230, Derwent Publications Ltd., London, GB; Class A32, AN 82–62325E & JP,A,57 098 321 (Showa Denko KK), 18 Jun. 1982.

Database WPI, Section Ch, Week 9220, Derwent Publications Ltd., London GB; Class A23, AN 92–163434 & JP,A,04 102 827 (Nippon Oil KK), 3 Apr. 1992.

Database WPI, Section Ch, Week 8902, Derwent Publications Ltd., London GB; Class A32, AN 89–013304 & JP,A,63 290 723 (Polyplastics KK), 28 Nov. 1988.

Mol (*J. Chemical Technologies, Japan*), vol. 26 (1), pp. 92–100 (1988).

*Converting Journal* (*Japan*), vol. 15 (6), pp. 15–21 (1987).

*Converting Journal* (*Japan*), vol. 16 (3), pp. 23–28 (1988).

*Primary Examiner*—Leo B. Tentoni
*Attorney, Agent, or Firm*—James L. McGinnis

[57] ABSTRACT

A process for treating a liquid crystal polymer film which includes the steps of: heating a film obtained by extrusion molding of a liquid crystal polymer, while contacting at least one surface of the film with a supporting body, to melt the polymer; cooling the melted polymer to form a solidified polymer layer; and separating the solidified polymer layer from the supporting body. The process readily provides liquid crystal polymer films having excellent resistance to intra-layer delamination and high tensile strength and elongation, as well as excellent resistance to abrasion, dimensional stability when heated, and resistance to folding.

4 Claims, No Drawings

PROCESS FOR TREATING LIQUID CRYSTAL POLYMER FILM

BACKGROUND OF THE INVENTION

1. Field of the Invention

The present invention relates to a process for wearing a film comprising a polymer capable of forming an optically anisotropic melt phase.

The film treated by the process of the present invention has the excellent resistance to heat and chemicals and the electrical properties inherent to polymers capable of forming an optically anisotropic melt phase, as well as a small dimensional change ratio when heated, resistance to intra-layer delamination, excellent resistance to folding, a moderate thermal expansion coefficient, and high strength and elongation. This film is, therefore, useful as a material for insulting tapes, packaging films and laminates for flexible printed wiring boards, multilayer thin film wiring boards, damping materials, and the like.

2. Description of the Prior Art

Polymers capable of forming an optically anisotropic melt phase (hereinafter sometimes referred to as "liquid crystal polymers") exhibit excellent resistance to heat and chemicals and excellent electrical properties (e.g., insulation property, dielectric property, etc.). These polymers, therefore, have attracted attention in various technical fields as useful materials for films.

Films made from liquid crystal polymers tend to have highly anisotropic mechanical properties due to high orientability during the melt extrusion molding of the polymers. Thus, melt extrusion of a liquid crystal polymer through a T die typically produces a uniaxially oriented film because shear or stress is applied only in the machine direction (hereinafter referred to as "MD"). The uniaxially oriented film has high tensile modulus and mechanical strength in MD, but low corresponding values in a direction perpendicular to MD (transverse direction, hereinafter referred to as "TD"), and hence has the drawback of readily forming tears in MD.

To reduce the anisotropy in mechanical properties, the application of a tubular film process to melt extrusion molding of liquid crystal polymers has been proposed (U.S. Pat. No. 4,333,907 and U.S. Pat. No. 5,053,481). This process involves stretching, or applying stress to the film, both in MD and TD to produce biaxially oriented films, which do not preferentially tear or split in MD. A tubular film process also can produce films in which the mechanical properties in MD and TD are well balanced.

However, uni- or biaxially oriented liquid polymer films obtained by the above melt extrusion processes have poor abrasion resistance, thereby tending, when their surface is rubbed, to form fibrils on the surface. They also have a high intra-layer delamination tendency so that laminates comprising the films and other materials tend to delaminate. Furthermore, these liquid crystal polymer films have internal swain due to stress having been applied during molding, and hence they tend to undergo dimensional changes or deform when heated for processing or other purposes. In addition, liquid crystal polymer films lack flexibility and readily break when folded repeatedly.

In order to improve the abrasion resistance and intra-layer delaminatability, a process of calendering a liquid crystal polymer film at a temperature that does not melt the film (Japanese Patent Application Laid-open No. 62144/1993), and a process of embossing the film under the same condition (Japanese Patent Application Laid-open No. 166323/1992), have been described.

A process for improving the dimensional stability of liquid crystal polymer films when heated, which comprises heating them at a temperature of about 30° C. lower than its melting point or below, has been described in U.S. Pat. No. 4,333,907. It has been reported that the use of this type of heat treatment, at a temperature below the flow initiation temperature, on a film obtained by melt extruding liquid crystal polyester while applying to it a shearing stress in TD, produced a heat treated film having a heat shrinkage at 180° C. of 0.03 to 0.1% (Japanese Patent Application Laid-open No. 23921/1991).

The above process of heat treating liquid crystal polymer films at a temperature below their melting point or flow initiation temperature tends to produce films having insufficient dimensional stability, unless a film produced by a special melt extrusion process is used, as described above. Heat treatment at a temperature below the melting point or flow initiation temperature is not widely usable for the purpose of obtaining a film having excellent dimensional stability.

The melt pressing of pellets of a liquid crystal polymer is a known alternative to melt extrusion as a process for molding liquid crystal polymer films. This process produces unoriented films, since liquid crystal polymers generally are not oriented during melt pressing (U.S. Pat. No. 4,717,624).

The melt pressing of liquid crystal polymer pellets can give a film having some, what better resistance to abrasion and intra-layer delamination as compared with films obtained by melt extrusion, but the film produced by this method has low tensile strength, and the film thickness is hard to control, thereby making this process of low practical applicability.

There is also known a process for producing laminates, which comprises heating a liquid crystal polymer film, which is contacted with a sheet of metal plate or metal foil or sandwiched between 2 sheets of metal plate or metal foil, under pressure, at a temperature at which the liquid crystal polymer either melts or does not melt, to bond them (U.S. Pat. No. 4,717,624 and Japanese Patent Application Laid-open Nos. 252738/1990 and 53739/1992 and 136038/1992 and European Patent Application Publication No. 507,332). However, the laminates obtained by this process are intended to be used as composites for printed wiring boards, vibration damping materials and the like, utilizing their laminate structure. Thus, there have been available no reports paying attention to the properties of the liquid crystal polymer layer itself formed in such laminates. Furthermore, it is not known to obtain a film by separating the liquid crystal polymer layer from the laminate.

Calendering or embossing liquid crystal polymer films under non-melting conditions does not sufficiently improve the intra-layer delamination and sometimes insufficiently improves their abrasion resistance.

SUMMARY OF THE INVENTION

The present invention is a process for treating a film made by extrusion molding a polymer capable of forming an optically anisotropic melt phase, which comprises the steps of:

heating said film, while contacting at least one surface of said film with a supporting body, to a temperature sufficient to melt said polymer;

cooling the melted polymer to form a solidified polymer layer; and separating said solidified polymer layer from said supporting body.

Said process may also comprise the additional step of:

heating the solidified polymer, before or after separation thereof from the supporting body, at a temperature in a range of from a minimum of about 150° C. to a maximum of about 30° C. below the thermal deformation temperature that said film had before undergoing said heating to melt said polymer.

An object of the present invention is to provide a simple process for readily obtaining a liquid crystal polymer film having both excellent resistance to intra-layer delamination and high strength and elongation, as well as good abrasion resistance, dimensional stability when heated and resistance to folding.

Another object of the present invention is to provide a liquid crystal polymer film having the above described excellent characteristics and obtained by the process of this invention.

Other objects and advantages of the present invention will be readily apparent to those skilled in the art from the following description.

DETAILED DESCRIPTION OF THE PREFERRED EMBODIMENT

The liquid crystal polymer (polymer capable of forming an optically anisotropic melt phase) used in the present invention includes, but is not limited to, known thermotropic liquid crystal polyesters and thermotropic liquid crystal polyesteramides comprising repeating units derived from the compounds represented by the following groups of compounds (1) through (4), or their derivatives. However, it is understood that to obtain a polymer capable of forming an optically anisotropic melt phase requires a suitable combination of repeating units.

(1) Aromatic or aliphatic dihydroxy compounds (Table 1 shows their representative examples.)

TABLE 1

(Chemical formulas of representative examples of aromatic or aliphatic dihydroxy compounds).

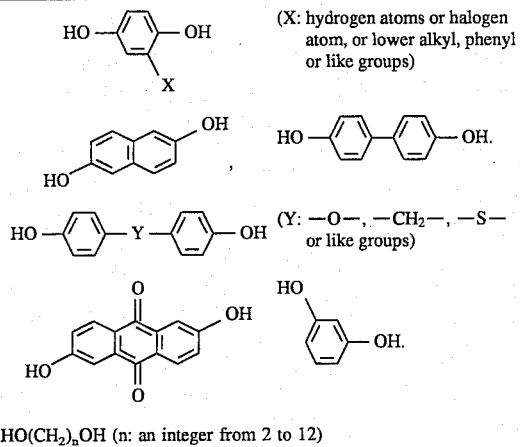

$HO(CH_2)_nOH$ (n: an integer from 2 to 12)

(2) Aromatic or aliphatic dicarboxylic acids (Table 2 shows their representative examples).

TABLE 2

(Chemical formulas of representative examples of aromatic or aliphatic dicarboxylic acids).

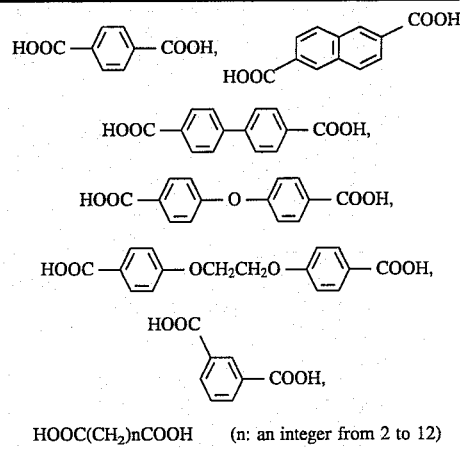

$HOOC(CH_2)nCOOH$ (n: an integer from 2 to 12)

(3) Aromatic hydroxycarboxylic acid (Table 3 shows their representative examples).

TABLE 3

(Chemical formulas of representative examples of aromatic hydroxycarboxylic acids).

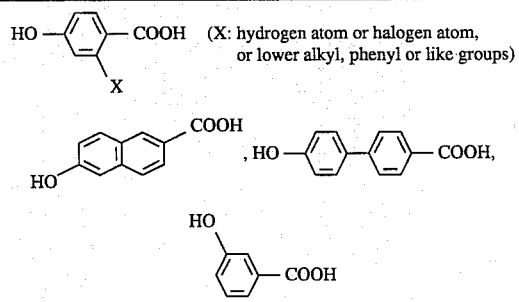

(4) Aromatic diamines, aromatic hydroxyamines and aromatic aminocarboxylic acids (Table 4 shows their representative examples.)

TABLE 4

(Chemical formulas of representative examples of aromatic diamines, aromatic hydroxyamines and aromatic aminocarboxylic acids).

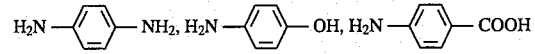

Representative examples of liquid crystal polymers obtained from the above starting material compounds are copolymers (a) through (e) having structural units as shown in Table 5.

TABLE 5

(Structural units of representative examples of liquid crystal polymers).

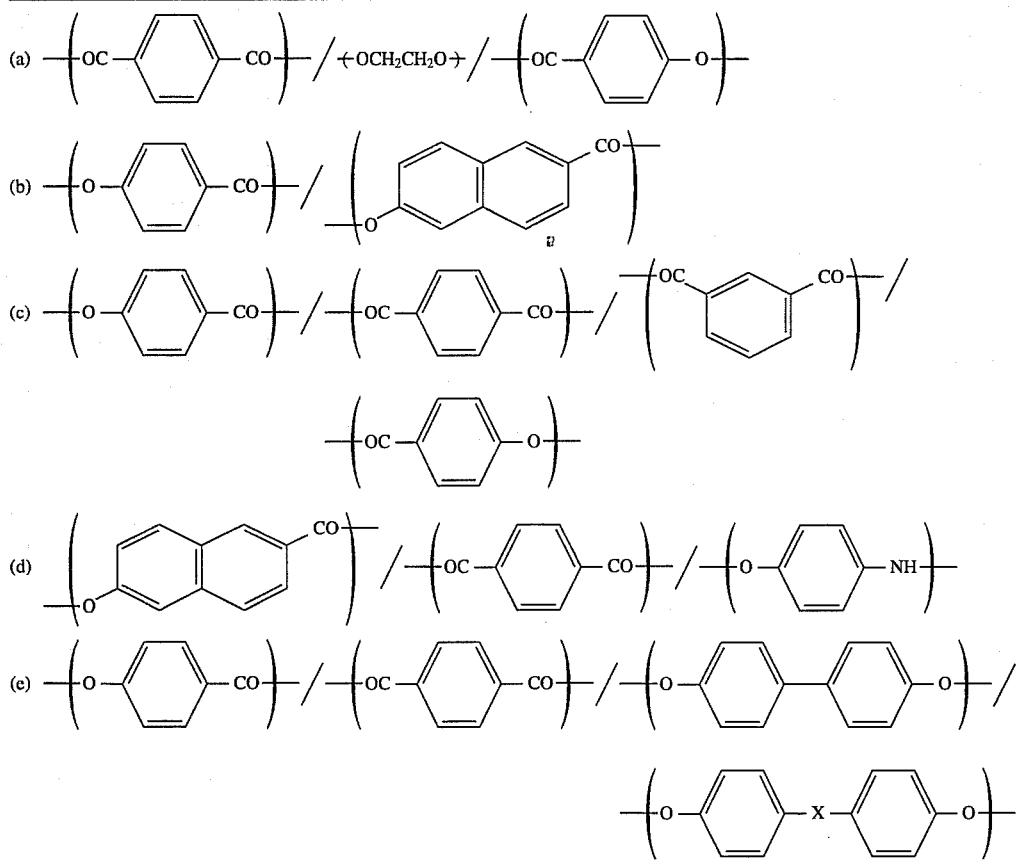

(X: —O—, —CH₂—, —S— or like groups)

It is desirable that the liquid crystal polymer used in the present invention have a transition temperature to an optically anisotropic melt phase in the range of from about 200° to about 400° C., more preferably from about 250° to about 350° C., to obtain desirable heat resistance and processability of the resulting film.

The film used in the present invention is obtained by melt extruding a liquid crystal polymer. Any melt extrusion molding is used for this purpose, but the well-known T-die process or tubular film process is commercially advantageous. The film used in the invention may have any thickness and includes those with plate-like or sheet-like forms having a thickness of not more than 5 mm. The film may contain a lubricant, antioxidant and like additives.

In the process of the present invention, first a film comprising a liquid crystal polymer is heated, while at least one surface thereof is contacted with a supporting body, to melt the polymer.

The temperature employed for the heat melting treatment may be any temperature at which the entire body throughout the thickness of the film substantially melts. This temperature is appropriately selected from a range of not less than the melting point of the liquid crystal polymer constituting the film to be treated, and not more than a temperature about 70° C. higher than the melting point. The melting point herein is a melting peak obtained by differential scanning calorimetry (DSC) when a to-be-treated film is melted by heating at a rate of 20° C./min and then quenched at 50° C./min down to 50° C. and, again, heated at a rate of 20° C./min. If the treating temperature is lower than the melting point, the polymer constituting the film will not substantially melt, and the resulting film will not have sufficiently improved resistance to abrasion and intra-layer delamination, nor sufficient dimensional stability when heated, resistance to folding, or improved tensile elongation at break. Furthermore, a treating temperature that is too low sometimes releases the internal strain created during extrusion molding, thereby causing deformation in the film, such as curling or slackening. On the other hand, a treating temperature that is too high deteriorates the polymer, and may cause discoloration or other problems. In addition, when heated at the wrong temperature films sometimes have insufficiently improved dimensional stability when heated and low mechanical properties.

During the heat melting treatment, the to-be-treated film, having at least one of its surfaces contacted with a supporting body, can maintain the shape of a film despite the melting of the polymer. The supporting body preferably comprises a material that does not substantially deform at the treating temperature employed, and suitable examples of such materials are metals (e.g. steel, copper, nickel, aluminum, silver amid gold), other inorganic substances (such as glass), and highly heat-resistant resins (such as polyimides). Use of a supporting body having a high coefficient of thermal conductivity, such as a metal, is particularly preferred, since it can speed up the elevation of the film temperature to the desired level, thereby shortening the heat melt treating time. It is desirable that the supporting body have a contact surface with the film that is substantially planar, such as film-like, sheet-like or plate-like, which readily prevents the polymer from flowing during melt treatment, although the contact surface may be a curved one, such as a roll-like surface. The planar surface may, as required, have minute projections and recesses. Examples of preferred supporting bodies are metal foils such as copper foil, aluminum foil and chrome-plated steel foil, and glass plate. The supporting body may have, on at least its surface contacting the film, a releasing layer comprising a releasing agent or film; this layer may comprise, e.g., a silicone resin, wax, a fluororesin or a polyimide.

During the heat melting treatment, one or both surfaces of the film are contacted with a supporting body. Where only one surface of the film is contacted with a supporting body, the other surface may be contacted with a gas, such as air or nitrogen, or a liquid, such as oil.

It is desirable, upon heat melting a film, to contact it closely or adhere it beforehand to the supporting body used. This close contact or adhesion is preferably conducted by heat pressing with a hot press or hot roll. The heat pressing temperature is selected depending on the pressing means employed, pressing condition, the type of the liquid crystal polymer constituting the film and the like, but in general the temperature is preferably in a range of from about 100° C. lower than the melting point of the liquid crystal polymer, to a temperature just below the melting point, i.e., 1° C. below. Where the film is laminated by closely contacting or adhering with a metal foil, hot roller pressing is industrially advantageous. Another employable method comprises melt extruding a liquid crystal polymer into a film onto a supporting body, to form a laminate.

An example of a suitable heating method in the heat melting treatment of this invention is to apply heat to the supporting body. This method of heating is applicable whether the supporting body contacts only one surface of the film or both surfaces thereof. When only one film surface is contacted with the supporting body, other applicable methods include blowing hot air onto the non-contacted surface of the film, irradiating the non-contacted surface with infrared radiation, and immersing the film together with the supporting body in a hot oil medium.

During the heat melting treatment, the film may either be pressed or not pressed.

An example of a commercially advantageous continuous process according to this invention comprises feeding a film placed on a supporting body into a continuous hot air heating apparatus having hot air nozzles arranged in the feeding direction of the film and blowing hot air from above the film in a direction perpendicular to the film surface. With this process, it is desirable to provide separate sections for temperature elevation, melt wearing and gradual cooling.

Another suitable process comprises heating and cooling the film under pressure with a vacuum press or plane plate press. Yet another suitable process comprises heating and cooling the film while pressing it between 2 sheets of a continuously moving endless belt, i.e. what is known as double belt press system. With these processes, the pressing means employed, such as plate or belt, may act as a supporting body, or a separate supporting body other than the pressing means can be used.

The heat-melt treating time is appropriately selected depending on the treating temperature, the type of heating means, the coefficient of thermal conductivity of the supporting body used, the rate of melting of crystal components of the film, the thickness of the film, the desired properties of the finished film, and the like. Suitable heat treatment times are generally in a range of from about 1 second to about 15 minutes. It is desirable to conduct the heat melting treatment according to the present invention in such a manner, as described later herein, as to make positive a thermal expansion coefficient in any optional direction in the film plane, which treatment gives films having well-balanced properties with the drawbacks eliminated, as intended by the present invention.

In the process of the present invention, after the film has been heat-melt treated, the melted polymer having a film-shape is then cooled down, while at least one surface thereof is in contact with the supporting body, to form a solidified polymer layer. Any cooling method can be used, such as natural cooling or cooling under controlled cooling conditions.

In the process of the present invention, the thus solidified polymer layer is then separated from the supporting body, to obtain the desired liquid crystal polymer film. The separation may be accomplished by any method, including peeling processes such as T-peeling (90° peeling) and 180° peeling, and chemical dissolution of the supporting body.

A releasing layer on the surface of the supporting body that contacts the film can be used to facilitate peeling.

Chemical dissolution processes can advantageously be employed when the supporting body is a metal foil. For example, if a polymer film with at least one surface thereof contacting a metal foil is heated and then cooled to form a polymer-metal foil laminate, the laminate may be chemically treated to dissolve away the metal foil layer. The dissolution of the metal foil can be achieved, e.g., by immersing the laminate in an aqueous solution of a metal-corroding substance such as ferric chloride or sodium hydroxide, at a prescribed temperature for a prescribed time. Those skilled in the art will readily be able to determine suitable parameters without undue experimentation.

The film obtained by the above treatment has, as described later herein, excellent resistance to abrasion and intra-layer delamination, dimensional stability when heated and resistance to folding, as well as high tensile strength and elongation. The film has, like many other materials, a positive coefficient of thermal expansion. In order to obtain a film having an even lower positive thermal expansion coefficient, it is desirable, in the above process, to heat the solidified polymer, either before it is separated from the supporting body or after separation, at a temperature in a range of from a minimum of about 150° C. to a maximum of about 30° C. below the thermal deformation temperature of the film before the treatment. This second heat treatment may be conducted by a process which comprises heating the solidified polymer layer or separated film up to the required temperature for a suitable time period.

The film obtained by the process of the present invention may have any thickness. However, for certain applications, for example for printed wiring boards, the film thickness should be preferably not more than about 5 mm, more preferably from about 0.1 to about 3 mm. For flexible printed wiring boards, the thickness is preferably not more than about 500 μm, more preferably from about 10 to about 250 μm. The film obtained may contain a lubricant, anti-oxidant and like additives.

The process of the present invention can give liquid crystal polymer films having excellent resistance to abrasion and intra-layer delamination, dimensional stability when heated and resistance to folding, as well as high tensile strength and elongation. The liquid crystal films obtained by the process of the invention have, in most cases, the following characteristic properties:

(i) a dimensional change ratio when heated of not more than 0.1% in its absolute value;

(ii) an intra-layer peeling strength of at least 2 kg/cm;

(iii) a ratio between the maximum value and minimum value of penetrated microwave intensity, when irradiated with microwave in a direction perpendicular to the film surface by microwave transmission method, of not more than 2;

(iv) a degree of planar orientation and of thickness orientation, as measured by X-ray diffractometry, of 50 to 70% and 50 to 80%, respectively;

(v) a folding resistance, as measured with an MIT tester, of at least 3,000 strokes;

(vi) a tensile strength of at least 5 kg/mm$^2$;

(vii) a tensile elongation at break of at least 10%; and (viii) a positive thermal expansion coefficient in any direction in the film plane.

The term "dimensional change ratio when heated" used above in (i) means the ratio of size change measured at 25° C. on a film sample before and after being allowed to stand under no tension in air at 190° C. for 30 minutes to the original length, and defined by the following formula.

$$\text{Dimensional change ratio when heated (\%)} = [(L_1 - L_0)/L_0] \times 100$$

where $L_0$=length of an optional segment on the film before it is treated in the above manner, and $L_1$=length of the same segment after the treatment.

If this ratio is positive, the film has expanded irreversibly by heating; if the ratio is negative the film has shrunk irreversibly by heating. The smaller the absolute value of the ratio, the smaller the dimensional change before and after the heating. Accordingly, a dimensional change ratio when heated of not more than 0.1% means markedly small dimensional change before and after heating.

The intra-layer peeling strength referred to above in (ii) can be measured by conducting a 90° peeling test in accordance with JIS C6471 on a laminated sheet prepared by laminating with an adhesive a copper foil each on both surfaces of a sample film. That is, a film that can exhibit in this test a peeling strength of at least 2 kg/cm has an intra-layer peeling strength of at least 2 kg/cm. The film having an intra-layer peeling strength of at least 2 kg/cm is very difficult to undergo intra-layer delamination.

The microwave transmission method described above in (iii) is the known method for determining molecular chain axis orientation in polymer films. See, for example, *Mol.*, Vol. 26(1), pages 92–100 (1988); *Convertec*, Vol. 15(6), pages 15–21 (1987) and *Convertec*, Vol. 16(3), pages 23–28 (1988). This method comprises observing dielectric relaxation arising from orientation polarization of local molecular movements by microwave. By this method the state of molecular chain axis orientation is known from dielectric anisotropy. More specifically, the method comprises irradiating microwave on the surface of a film sample in a direction perpendicular to the film plane and measuring the intensity of transmitted microwave, which indicates the amount of interaction between microwave and polar molecular consisting the film, while changing the measuring angle, and calculating the ratio between the maximum intensity and the minimum intensity obtained [i.e. (maximum value of the intensity of transmitted microwave)/ (minimum value of the intensity of transmitted microwave)].

A film having this ratio of not more than 2 has very small anisotropy of molecular chain axis orientation in the film plane.

The degree of planar orientation described above in (iv) shows the degree of regularity of molecular chain axis orientation in the crystalline region in the film plane. This degree becomes 0% when the direction of molecular chain axis orientation in the crystalline region in the film plane is completely random and becomes 100% for completely unidirectional molecular chain axis orientation. The degree of thickness orientation herein shows the degree of regularity of molecular chain axis orientation in the crystalline region in a plane perpendicular to the film plane. This degree becomes 0% when the direction of molecular chain axis orientation in the crystalline region in a plane perpendicular to the film plane is completely random and 100% for completely unidirectional orientation. A film having a degree of planar orientation and that of a thickness orientation as measured by X-ray diffractometry of 50 to 70% and 50 to 80%, respectively, has excellent resistance to abrasion, intra-layer delamination and folding, and has high tensile strength. The degree of planar orientation is herein obtained as follows. X-ray is irradiated with a wide-angle X-ray diffractometer on the film surface in a direction perpendicular to the film plane and calculated by the following equation from the half width, $\phi_1$ (degree), in the (006) plane diffraction intensity curve obtained.

$$\text{Degree of planar orientation (\%)} = [(180 - \phi_1)/180] \times 100$$

The degree of thickness orientation is herein obtained as follows. X-ray is irradiated with a wide-angle X-ray diffractometer on the film in a direction parallel to the film plane and calculated by the following equation from the half width, $\phi_2$(degree), in the (006) plane diffraction intensity curve obtained.

$$\text{Degree of thickness orientation (\%)} = [(180 - \phi_2)/180] \times 100$$

The folding resistance as measured with an MIT tester in the above (v) is obtained by conducting a repeated folding test in accordance with JIS P8115 under the condition of a curvature radius of bent part of 0.4 mm, a static load of 0.5 kg and a rate of 170 strokes/rain, at left and fight angles of 135°±5° and recording the number of folding strokes until an abnormal appearance such as break or crack occurs on the sample. A film having a folding resistance as measured with an MIT tester of at least 3,000 strokes can be said to have excellent resistance to folding.

The tensile strength referred to above in (vi) is measured with a tensile tester in accordance with JIS C2318. A film having a tensile strength of at least 5 kg/mm2 can be said to have a practically serviceable strength, being difficult to break.

The tensile elongation referred to above in (vii) is measured with a tensile tester in accordance with JIS C2318. A film having a tensile elongation of at least 10% can be said to have a desirable flexibility.

The thermal expansion coefficient (°C.$^{-1}$) referred to above in (viii) is obtained by measuring the length ($X_0$) of a segment in an optional direction on the surface of a film sample kept at a temperature of 30° C. and that ($X_1$) at 150° C. and calculating by the following equation:

Thermal expansion coefficient (°C.$^{-1}$)=$(X_1-X_0) / X_0 \cdot \Delta T$) where $\Delta T$ =absolute value (°C.) of difference between the measuring temperatures for $X_0$ and $X_1$.

Since the thermal expansion coefficient is determined based on the length at 30° C. and that at 150° C., films having a positive thermal expansion coefficient on this basis are included in the films having the feature described above in (viii) whether or not the films have a positive thermal expansion coefficient between 30° C. and a temperature higher than 150° C. The expression "has a positive thermal expansion coefficient in any direction in the film plane" herein means that: when 4 straight lines are drawn on the surface of the film, each at an angle of 45° with the next one, through a common point located on the surface of the film, all of the thermal expansion coefficients in the directions of the 4 lines are positive. Uniaxially oriented liquid crystal polymer films obtained by the usual T-die process, having high anisotropy also in thermal expansion coefficient, exhibit a positive thermal expansion coefficient in TD and a zero or negative coefficient in MD. Biaxially oriented liquid crystal polymer films obtained by the tubular film process show, generally, a negative expansion coefficient in at least one direction on the film surface. It sometimes happens that a film obtained by heat pressing liquid crystal polymer pellets have a positive thermal expansion coefficient in any direction in the film plane, but this type film has a very low tensile strength of less than 5 kg/mm$^2$ and hence lacks practical utility.

The aforementioned film having a positive thermal expansion coefficient (°C.$^{-1}$) in any direction, when laminated with other materials such as metal foil that also have a positive thermal expansion coefficient, resists curling or delamination. It is desirable that the film have a positive thermal expansion coefficient of not more than about +90×10$^{-6}$ (°C.$^{-1}$), more preferably in the approximate range of 5×10$^{-6}$ to +40×10$^{-6}$ (°C.$^{-1}$), to approximately match those of the other materials to which the film typically is laminated. For example, since copper foil has a thermal expansion coefficient of +20×10$^{-6}$ (°C.$^{-1}$), flexible printed wiring boards having a substrate of the film having a thermal expansion coefficient in the above range with a copper foil laminated thereon experience only minimal curling. In the present invention, a thermal expansion coefficient of +5×10$^{-6}$ to +40 X 10$^{-6}$ (°C.$^{-1}$) is very effectively achieved by a second heat treatment at a temperature in a range of from a minimum of about 150° C. to a maximum of about 30° C. lower than the thermal deformation temperature of the original film.

The film of the present invention is useful as a material for insulating tapes, packaging films and laminates for flexible printed wiring boards, multilayer thin film wiring boards, damping materials, the like.

Although it is uncertain why liquid crystal polymer films having the above described excellent properties can be obtained by the process of the present invention, it may be due to the following reasons. In films just after extrusion, the liquid crystal polymer molecule chain axes are oriented principally in the direction of the film plane and are highly oriented in the plane. Heat melting treatment of the melt extruded films according to this invention is believed to permit at least some of the oriented polymer molecules to orient themselves somewhat randomly, at an angle with the film plane.

Other features and advantages of the invention will become apparent to those skilled in the art from the following descriptions of exemplary embodiments, which are intended merely to illustrate the invention and are not intended to limit the scope thereof.

EXAMPLES

Evaluation of the films obtained in the Examples and Comparative Examples that follow was made according to the following methods.

(1) Melting point ($T_m$)

A film sample is observed with a differential scanning calorimeter for thermal behavior. The sample is heated at a temperature elevation rate of 20° C./min to melt it completely, and the melt is quenched at a rate of 50° C./min down to 50° C. and then heated again at a rate of 20° C./min. The position of endothermic peak appearing during this procedure is recorded as the melting point of the sample.

(2) Thermal deformation temperature

A thermal mechanical analyzer (TMA, made by Rigaku Denki Co.) is used. A film sample of 5-mm width and 20-mm length is loaded with 1 g and heated at a temperature elevation rate of 10° C./min and a temperature (°C.) vs. dimensional change ratio (%) curve is drawn. From the curve, a temperature at which the gradient of the curve becomes 0%/°C., just before the dimensional change ratio changes from negative region (shrinkage to positive (expansion), is taken as the thermal deformation temperature.

(3) Discoloration

A film sample is visually observed for discoloration.

(4) Flatness

A film sample is sandwiched between two glass plates having smooth surface and visually observed for presence of nonflat part.

(5) Dimensional change ratio when heated

A length is marked on a film sample in MD and in TD. The sample is then allowed to stand without tension in a high-temperature hot air drying oven made by Tabai Co. for 30 minutes at 190° C. The length is measured at 25° C. before and after the heating and the dimensional change ratio is calculated by the following equation.

Dimensional change ratio when heated (%)=[(length after heating−length before heating)/length before heating]×100

(6) Abrasion resistance

On the surface of a horizontally placed specimen a square abrasion mass with its bottom surface having a size of 10 mm×15 mm and covered with a textile fabric is placed. The mass is, while being loaded with a weight of 500 g, moved forward and backward continuously on the film surface by a distance of 30 mm. The number of strokes made until fluffs become visually observed on the film surface is counted and taken as an index of abrasion resistance.

(7) Resistance to intra-layer delamination (Method I)

An epoxy resin adhesive (ARON MIGHTY AS-60, made by Toagosei Chemical Industry Co., Ltd.) is applied on both surface of a film sample to a thickness of 50 μm. The two surfaces are each joined with a course surface of an electrolytic copper foil having a surface roughness of 10 μm and the assembly is heat pressed at 190° C. for 10 minutes to cure the adhesive, to prepare a test specimen for peeling test. The 10-mm wide specimen is subjected to JIS C6471 90° peeling test. The procedure comprises adhering one surface of the specimen to a supporting plate with a double-sided adhesive tape and pulling the copper foil on the opposite surface in a direction perpendicular to the supporting plate surface at a rate of 50 mm/min to obtain a peeling strength and check occurrence of intra-layer delamination.

In the above test, a peeling strength of at least 2 kg/cm leads to judgement that the film specimen has an intra-layer peeling strength of at least 2 kg/cm; and a peeling strength of less than 2 kg/cm with intra-layer delamination being observed judges that the intra-layer peeling strength of the specimen is less than 2 kg/cm.
(Method II)

Electrolytic copper foils each having a thickness of 35 μm are placed on each surface of a film sample via an adhesive tape (SAFV, made by Nikkan Kogyosha Co.) and this assembly is heat pressed at 190° C. for 10 minutes to make a test specimen for peeling test. A 90° peeling test is conducted using this test specimen in accordance with JIS C6471. The procedure comprises adhering one surface of a 15-mm wide test specimen to a supporting plate with a double-sided adhesive tape. The copper foil on the opposite surface is pulled in a direction perpendicular to the supporting plate at a rate of 50 mm/min, to obtain a peeling strength and to check occurrence of intra-layer delamination of the sample.

In this test also, a peeling strength of at least 2 kg/cm leads to judgement that the film specimen has an intra-layer peeling strength of at least 2 kg/cm; and a peeling strength of less than 2 kg/cm with intra-layer delamination being observed judges that the intra-layer peeling strength of the specimen is less than 2 kg/cm.
(Method III)
IPC-TM-650 #2.4.9 Method "C"
Etched specimen - solder floated @2° C.

Representative samples of a clad composite are imaged and etched per standard procedure to obtain "0.125" etched conductors. The etched conductors are then coated with silicone grease and dried in an air circulating oven at 135° C. for one hour. The specimens are removed from the oven and cooled to standard conditions (50% RH at 23° C.), and then solder floated, conductor side down, in molten Sn60 solder at 288° C. for at least 5 seconds.

The conductors are burned to start the end peel of specimens and attached to a 6" free wheeling rotary drum with double-sided tape. The conductors are peeled at a crosshead speed of 2 inches/minute while continuously recording the applied load. A minimum of 2.25" conductor length must be pulled and the first 0.25" is disregarded.

The average chart reading over the entire peel length is recorded and the peel strength computed as below:

Peel Strength (PLI)=Force (lbs)×8 (conductor width 0.125")=pounds/inch width

Peel Strength (kg/cm)=Peel Strength (PLI) divided by 5.59

Peel Strength reported in pounds per linear inch (PLI) and mode of failure were reported for each sample. When inter-layer delamination is observed this value is a measure of the cohesive strength.
(8) Orientation ratio A specimen of 10 cm×10 cm is tested with a microwave molecular orientation tester (MOA-2001A, made by KS Systems) for transmission ratio of microwave of about 4 GHz at various angles. The maximum transmission ratio/the minimum transmission ratio gives the orientation ratio of the specimen.
(9) Degree of planar orientation and degree of thickness orientation S-ray is irradiated on a film sample with a wide-angle X-ray diffractometer (made by Rigaku Denki Co.) in a direction perpendicular to the film plane. The degree of planar orientation is obtained from the half-width of the orientation distribution curve of the most intensive peak (006 plane). The degree of thickness orientation is obtained in the same manner except that X-ray is irradiated in a direction perpendicular to the cross-section of the sample.
(10) Mechanical properties (tensile strength and elongation at break)

Tensile strength and tensile elongation are measured with a tensile tester according to JIS C2318.
(11) Resistance to folding A film sample is folded with an MIT type tester (JIS P8115) at a folding curvature radius of 0.4 mm and a static load of 0.5 kg and at a rate of 170 strokes/min. The number of strokes when the sample breaks or causes appearance change such as cracks is taken as an index of resistance to folding.
(12) Thermal expansion coefficient A thermomechanical analyzer (TMA, made by Rigaku Denki Co.) is used. A film sample of 5 mm wide and 20 mm long is loaded with 1 g and heated at a temperature elevation ratio of 10° C./min and a temperature vs. dimensional change ratio curve is drawn. The thermal expansion coefficient is the gradient of a straight line passing the 2 points at 30° C. and 150° C. of the curve.

Four thermal coefficients are obtained on a film sample in MD, TD and 2 directions at an angle of 45° C. with MD or TD (hereinafter the latter two directions are called MDH and TDH, respectively).

Reference Example.1

A thermotropic liquid crystal polyester containing 27 mol % of units from 6-hydroxy-2-naphthoic acid and 73 mole % of units from p-hydroxybenzoic acid was heat kneaded through a single-screw extruder at a temperature of 280 to 300° C. and extruder through an annular die having a diameter of 40 mm and a lip clearance of 0.6 mm, producing a film having a thickness of 30 μm. The film obtained had a melting point Tm of 280° C. and a thermal deformation temperature of 200° C. This liquid crystal polymer film was named A.

Reference Example 2

A thermotropic liquid crystal polyester containing 20 tool % of units from 6-hydroxy-2-naphthoic acid and 80 mole % of units from p-hydroxybenzoic acid was heat kneaded through a single-screw extruder at a temperature of 310 to 350° C. and extruded through an annular die having a diameter of 40 mm and a lip clearance of 0.6 mm, producing a film having a thickness of 30 μm. The film obtained had a melting point Tm of 330° C. and a thermal deformation temperature of 260° C. This liquid crystal polymer film was named B.

Examples 1 through 3

A laminate was obtained by heat pressing together the liquid crystal polymer film A obtained in Reference Example 1 and a supporting body of a copper foil having a thickness of 18 μm (by electrolytic method, ½ounce) at 260° C. The laminate thus obtained was held horizontally, with the film facing up and the copper foil down, while being heat-melt treated in a hot air heating oven at temperatures in a range of 285 to 350° C. for 1 to 10 minutes (both as shown in Table 6) and then gradually cooled to 100° C. at a cooling rate of 20° C./min. The copper foil was then etched off from each treated laminate with an aqueous ferric chloride solution. The residual film samples were subjected to various evaluation tests. The results obtained are shown in Tables 6 through 8.

Examples 4

A laminate was obtained by heat pressing liquid crystal polymer film A obtained in Reference Example 1 between 2 sheets of a supporting body of a copper foil having a thickness of 18 μm (by electrolytic method, ½ounce) at 260° C. The laminate thus obtained was heat-melt treated with a vacuum heat press at 285° C. under an areal pressure of 20 kg/cm² for 10 minutes and then gradually cooled to 100° C. The copper foil sheets were then etched off the treated laminate with an aqueous ferric chloride solution. The residual film sample was subjected to various evaluation tests. The results obtained are shown in Table 6 through 8.

Comparative Example 1

The liquid crystal polymer film A obtained in Reference Example (non- heat-treated) was evaluated. The results are also shown in Tables 6 through 8.

Comparative Example 2

A laminate was obtained by heat pressing together the liquid crystal polymer film A obtained in Reference Example 1 and a supporting body of a copper foil having a thickness of 18 μm (by electrolytic method, ½ounce) at 260° C. The laminate thus obtained was heat treated in a hot air heating oven in the same manner as in Example 1 except that the treating temperature and time were 360° C. and 0.5 minutes. The copper foil was then etched off from the treated laminate. The results of evaluation of the residual film sample are shown in Tables 6 through 8.

Comparative Example 3

A laminate was obtained by heat pressing together the liquid crystal polymer film A obtained in Reference Example 1 and a supporting body of a copper foil having a thickness of 18 μm (by electrolytic method, 1/2 ounce) at 260° C. The laminate thus obtained was heat treated in a hot air heating oven in the same manner as in Example 1 except that the treating temperature and time were 235° C. and 5 minutes, i.e. under non-melting conditions. The copper foil was then etched off from the treated laminate. The results of evaluation of the residual film sample are shown in Tables 6 through 8.

Examples 5 and 6

A laminate was obtained by heat pressing together the liquid crystal polymer film B obtained in Reference Example 2 and a supporting body of a copper foil having a thickness of 18 μm (by electrolytic method, ½ounce) at 290° C. The laminate thus obtained was held horizontally with the film facing up and the copper foil down while being heat-melt treated in a hot air heating oven at a temperature of 340° or 370° C. for 5 or 10 minutes as shown in Table 7, and then gradually cooled to 100° C. at a cooling rate of 20° C./min. The copper foil was then etched off from each treated laminate with an aqueous ferric chloride solution, to obtain a film having improved transparent appearance. The results of evaluation on the obtained film are shown in Tables 7 and 8.

Comparative Example 4

The liquid crystal polymer film B obtained in Reference Example 2 (non-heat-treated) was evaluated. The results are also shown in Tables 7 and 8.

Comparative Example 5

The liquid crystal polymer film B obtained in Reference Example 2 was heat treated in the same manner as in Example 5 except that the treating temperature was changed to 290° C., i.e. under non-melting conditions. The copper foil was then etched off from the treated laminate. The results of evaluation of the residual film are shown in Tables 7 and 8.

TABLE 6

| | Film to be treated | Heat-melt treating conditions temperature (°C.) | time (min.) | Discoloration after heat-melt treatment | Surface flatness before measurement of dimensional change ratio when heated | after measurement of dimensional change ratio when heated | Dimensional change ratio when heated MD (%) | TD (%) |
|---|---|---|---|---|---|---|---|---|
| Example 1 | A | 285 | 10 | no | good | good | 0.04 | 0.05 |
| Example 2 | A | 300 | 2 | no | good | good | 0.06 | −0.02 |
| Example 3 | A | 350 | 1 | no | good | good | 0.08 | −0.03 |
| Example 4 | A | 285 | 10 | no | good | good | 0.5 | 0.03 |
| Comp. Ex. 1 | A | — | — | no | bad | bad | −0.3 | −0.22 |
| Comp. Ex. 2 | A | 235 | 5 | no | good | bad | −0.24 | 0.08 |
| Comp. Ex. 3 | A | 360 | 0.5 | yes | good | good | 0.15 | −0.05 |

TABLE 7

| | Film to be treated | Heat-melt treating conditions temp. (°C.) | time (min) | Intra-layer peeling strength (kg/cm) (peeling) direction: MD)* |
|---|---|---|---|---|
| Example 1 | A | 285 | 10 | >2.0 |
| Example 2 | A | 300 | 2 | >2.0 |
| Example 3 | A | 350 | 1 | >2.0 |
| Example 4 | A | 285 | 10 | >2.0 |
| Comp. Ex. 1 | A | — | — | 0.2 |
| Comp. Ex. 2 | A | 235 | 5 | 0.2 |
| Comp. Ex. 3 | A | 360 | 0.5 | >2.0 |
| Example 5 | B | 340 | 10 | >2.0 |
| Example 6 | B | 370 | 5 | >2.0 |
| Comp. Ex. 4 | B | — | — | 0.2 |
| Comp. Ex. 5 | B | 290 | 10 | 0.2 |

*In accordance with Method I.

TABLE 8

| | Film to be treated | Heat-melt treating conditions | | Microwave molecular orientation | X-ray diffractometry | | Strength (kg/mm²) | | Elongation (%) | | Resistance to folding |
|---|---|---|---|---|---|---|---|---|---|---|---|
| | | temp. (°C.) | time (min) | Ratio of orientation | Degree of planar orientation | Degree of thickness orientation | MD | TD | MD | TD | (strokes) |
| Example 1 | A | 285 | 10 | 1.8 | 67 | 80 | 18 | 161 | 15 | 17 | >3,000 |
| Example 2 | A | 300 | 2 | 1.1 | 69 | 75 | 15 | 4 | 21 | 20 | >3,000 |
| Example 3 | A | 350 | 1 | 1.0 | 65 | 71 | 12 | 11 | 25 | 23 | >3,000 |
| Example 4 | A | 285 | 10 | 1.6 | 65 | 75 | 16 | 15 | 21 | 17 | >3,000 |
| Comp. Ex. 1 | A | — | — | 4.5 | 67 | 87 | 45 | 25 | 4 | 3 | 1,200 |
| Comp. Ex. 2 | A | 235 | 5 | 4.5 | 67 | 87 | 43 | 27 | 5 | 4 | 1,000 |
| Comp. Ex. 3 | A | 360 | 0.5 | 1.0 | 65 | 71 | 12 | 11 | 25 | 20 | >3,000 |
| Example 5 | A | 340 | 10 | 1.7 | 66 | 75 | 17 | 14 | 15 | 18 | >3,000 |
| Example 6 | A | 370 | 5 | 1.0 | 65 | 72 | 12 | 9 | 26 | 24 | >3,000 |
| Comp. Ex. 4 | A | — | — | 4.0 | 68 | 88 | 48 | 30 | 5 | 7 | 1,000 |
| Comp. Ex. 5 | A | 290 | 10 | 4.0 | 69 | 88 | 49 | 31 | 4 | 6 | 800 |

Reference Example 3

A thermotropic liquid crystal polyester containing 27 mol % of units from 6-hydroxy-2-naphthoic acid and 73 mol % of units from p-hydroxybenzoic acid was melt extruded through a T-die to give a film having a thickness of 30 μm. The film obtained had a melting point Tm of 280° C. and a thermal deformation temperature of 220° C. This liquid crystal polymer film was named C.

Reference Example 4

A thermotropic liquid crystal polyester containing 60 mol % of units from p-hydroxybenzoic acid, 8 mol % of units from 6-hydroxy-2-naphthoic acid, 16 mol of units from 4,4'-biphenol and 16 mol % of units from terephthalic acid was heat kneaded at a temperature of 330° to 350° C. through a single-screw extruder and extruded through an annular die having a diameter of 40 mm, a lip clearance of 0.6 mm, to give a film having a thickness of 30 μm. The film obtained had a melting point Tm of 331° C. and a thermal deformation temperature of 260° C. This liquid crystal polymer film was named D.

Examples 7 through 10

A laminate was obtained by heat pressing together the liquid crystal polymer film A obtained in Reference Example 1 and a supporting body of a copper foil having a thickness of 18 μm (by electrolytic method, ½ounce) at 260° C. The laminate thus obtained was held horizontally with the film facing up and the copper foil down while being heat-melt-treated in a hot air heating oven at temperatures in a range of 285 to 340° C. for 2 to 4 minutes (both as shown in Table 9), and then gradually cooled to 100° C. at a cooling rate of 20° C./min. The copper foil was then etched off the treated laminates with an aqueous ferric chloride solution (as shown in Table 10) to obtain liquid crystal polymer films having improved transparent appearance. The results of evaluation of the films thus obtained are shown in Tables 11 and 12.

The films obtained were, separately, further heat treated at 170° C. for 1 minute and then gradually cooled to 100° C. at a rate of 20° C./min. These twice-heat-treated films were then tested for thermal expansion coefficient; these results are shown in Table 12.

Examples 11 and 12

Example 7 was repeated except that an aluminum foil having a thickness of 30 μm was used as the supporting body, and the heat treating conditions shown in Table 9 were employed. The resulting heat treated laminates, had improved appearances similar to those of Examples 7 through 10. These laminates were immersed in an aqueous sodium hydroxide solution at 65° C. (as shown in Table 10) to dissolve off the aluminum foil. The results of evaluation of the thus obtained liquid crystal films are shown in Tables 11 and 12.

Example 13

Example 8 was repeated except that the supporting body was a chrome-plated steel foil (thickness: 50 μm) coated thinly with silicone oil, to obtain a heat treated laminate. After the heat-melt treatment, the liquid crystal polymer film easily peeled away from the supporting body. The results of evaluation of the resulting polymer film are shown in Tables 11 and 12.

Example 14

Example 8 was repeated except that film C from Reference Example 3 was used to obtain a heat treated laminate. The copper film then was etched off the polymer film. The results of evaluation of the polymer film are shown in Tables 11 and 12.

Example 15

The liquid crystal polymer film A obtained in Reference Example 1 was sandwiched between 2 sheets of a polyimide film (KAPTON™, made by Toray-Du Pont Industries, Inc.) having a thickness of 50 μm and then heat-melt treated by heat pressing under the conditions shown in Table 9. The polyimide film was peeled off the liquid crystal polymer as shown in Table 10. The results of evaluation on the resulting liquid crystal polymer film are shown in Tables 11 and 12.

Examples 16 through 18

Heat-melt treatment was conducted by heating laminate samples while sandwiching each sample between 2 metallic endless belts (double belt press system) under a pressure of 12 bar. As shown in Table 9, film A or film C had been laminated on both surfaces thereof with a sheet of copper foil, aluminum foil, or Teflon film. After the heat treatment, the supporting bodies were removed either by chemical etching or peeling, as shown in Table 10. The results of evaluation of the films thus obtained are shown in Tables 11 and 12.

Example 19

Example 7 was repeated except that the film B was used, and the heat treating conditions shown in Table 9 were employed, to achieve lamination with a copper foil, heat-melt treatment, and removal of the copper foil. The results of evaluation of the film thus obtained are shown in Tables 11 and 12.

The film obtained was, separately, further heat treated at 190° C. for 2 minutes and then gradually cooled to 100° C.

at a rate of 20° C./min. The resulting twice,-heat-treated film was tested for thermal expansion coefficient; the result is shown in Table 12.

Example 20

Example 16 was repeated except that the film B was used and that heat treating conditions as shown in Table 9 were employed, to conduct lamination with a copper foil, heat-melt treatment and removal of copper foil. The results of evaluation of the film thus obtained are shown in Tables 11 and 12.

Example 21

Example 7 was repeated except that heat-melt treatment was conducted by using an induction heated heat-pipe roll at 390° C. for 15 seconds instead of using a hot air heating oven, to conduct lamination with a copper foil, heat-melt treatment (the copper foil side contacting the roll) and removal of copper foil. The results of evaluation of the film thus obtained are shown in Tables 11 and 12.

Example 22

Example 7 was repeated except that the film D obtained in Reference Example 4 was used, and heat treating conditions as shown in Table 9 were employed, to achieve lamination with a copper foil, heat-melt treatment, and removal of copper foil. The results of evaluation of the film thus obtained are shown in Tables 11 and 12.

Comparative Example 6

The film A obtained in Reference Example 1 (non-heat-treated) was evaluated again. The results obtained are shown in Tables 11 and 12.

Comparative Example 7

The film B obtained in Reference Example 2 (non-heat-treated) was evaluated again. The results obtained are shown in Tables 11 and 12.

Comparative Example 8

Example 7 was repeated except that the heat treating temperature and time were changed to 240° C. and 4 minutes, respectively, to perform heat treatment under non-melting conditions. The results of evaluation of the obtained film are shown in Tables 11 and 12.

Comparative Examples 9 and 10

The same liquid crystal polymer chips used for preparing the film A or B in Reference Example 1 or 2 were, as shown in Tables 9 and 10, heated while being pressed between 2 chrome-plated steel sheets coated with a silicone oil, to provide films each having a thickness of 30 μm. The results of evaluation of the 2 films are shown in Tables 11 and 12.

TABLE 9

| | Tm (°C.) | Film to be treated | Supporting body | Heating conditions | | |
|---|---|---|---|---|---|---|
| | | | | (temp. °C.) | time (Min) | Apparatus |
| Example 7 | 280 | A | Copper 18 μm | 300 | 2 | Hot air heating oven |
| Example 8 | 280 | A | " | 320 | 2 | " |
| Example 9 | 280 | A | " | 340 | 2 | " |
| Example 10 | 280 | A | " | 285 | 4 | " |
| Example 11 | 280 | A | Aluminum 30 μm | 320 | 2 | " |
| Example 12 | 280 | A | " | 340 | 1 | " |
| Example 13 | 280 | A | Chrome-plated steel 50 μm* | 320 | 2 | " |
| Example 14 | 280 | C | Copper 18 μm | 320 | 2 | " |
| Example 15 | 280 | A | Polyimide film 50 μm | 320 | 1.5 | Heat press |
| Example 16 | 280 | A | Copper 18 μm | 320 | 0.5 | Double belt press |
| Example 17 | 280 | C | Aluminum 30 μm | 320 | 0.5 | " |
| Example 18 | 280 | A | Teflon film | 320 | 0.5 | " |
| Example 19 | 330 | B | Copper 18 μm | 360 | 2 | Hot air heating oven |
| Example 20 | 330 | B | " | 360 | 0.5 | Double belt press |
| Example 21 | 280 | A | " | 390 | 0.25 | Induction heated heat-pipe roll |
| Example 22 | 331 | D | " | 360 | 2 | Hot air heating oven |
| Comp. Ex. 6 | 280 | A | — | — | — | — |
| Comp. Ex. 7 | 330 | B | — | — | — | — |
| Comp. Ex. 8 | 280 | A | Copper 18 μm | 240 | 4 | Hot air heating oven |
| Comp. Ex. 9 | 280 | — | Chrome-plated steel 50 μm* | 320 | 2 | Heat press |
| Comp. Ex. 10 | 330 | — | " | 360 | 2 | " |

*Coated beforehand with silicone oil as a releasing agent.

TABLE 10

| | METHOD FOR REMOVING SUPPORTING BODY |
|---|---|
| Example 7 | Etching with ferric chloride solution |
| Example 8 | " |
| Example 9 | " |
| Example 10 | " |
| Example 11 | Etching with aqueous sodium hydroxide solution (65° C.) |
| Example 12 | Etching with aqueous sodium hydroxide solution (65° C.) |
| Example 13 | Peeling off |
| Example 14 | Etching with ferric chloride solution |
| Example 15 | Peeling off |
| Example 16 | Etching with ferric chloride solution |
| Example 17 | Etching with aqueous sodium hydroxide solution (65° C.) |
| Example 18 | Peeling off |
| Example 19 | Etching with ferric chloride solution |
| Example 20 | " |
| Example 21 | " |
| Example 22 | " |
| Comp. Ex. 6 | — |
| Comp. Ex. 7 | — |
| Comp. Ex. 8 | Etching with ferric chloride solution |
| Comp. Ex. 9 | Peeling off |
| Comp. Ex. 10 | " |

TABLE 11

|  | Tensile strength (kg/mm²) | | Abrasion resistance | Intra-layer Peeling Strength* |
|---|---|---|---|---|
|  | MD | TD | (strokes) | (kg/cm) |
| Example 7 | 15 | 14 | >300 | >2.0 |
| Example 8 | 14 | 13 | >300 | >2.0 |
| Example 9 | 12 | 11 | >300 | >2.0 |
| Example 10 | 16 | 15 | >300 | >2.0 |
| Example 11 | 15 | 13 | >300 | >2.0 |
| Example 12 | 14 | 13 | >300 | >2.0 |
| Example 13 | 14 | 13 | >300 | >2.0 |
| Example 14 | 16 | 14 | >300 | >2.0 |
| Example 15 | 17 | 15 | >300 | >2.0 |
| Example 16 | 16 | 15 | >300 | >2.0 |
| Example 17 | 18 | 16 | >300 | >2.0 |
| Example 18 | 19 | 18 | >300 | >2.0 |
| Example 19 | 14 | 13 | >300 | >2.0 |
| Example 20 | 16 | 15 | >300 | >2.0 |
| Example 21 | 14 | 13 | >300 | >2.0 |
| Example 22 | 18 | 16 | >300 | >2.0 |
| Comp. Ex. 6 | 45 | 25 | 3 | 0.2 |
| Comp. Ex. 7 | 48 | 30 | 2 | 0.2 |
| Comp. Ex. 8 | 42 | 26 | 3 | 0.2 |
| Comp. Ex. 9 | 4 | 4 | >300 | >2.0 |
| Comp. Ex. 10 | 4 | 4 | >300 | >2.0 |

*Measured in accordance with Method II.

TABLE 12

| | Thermal expansion coefficient ppm/°C., 30 to 150° C.) | | | | | | | | | | | |
|---|---|---|---|---|---|---|---|---|---|---|---|---|
| | Original film | | | | Film after heat treatment | | | | Film after re-heat treatment | | | |
| | MD | MDH | TD | TDH | MD | MDH | TD | TDH | MD | MDH | TD | TDH |
| Example 7 | −3.1 | −3.5 | −4.0 | −3.5 | 40 | 45 | 50 | 46 | 14 | 15 | 17 | 16 |
| Example 8 | −3.1 | −3.5 | −4.0 | −3.5 | 48 | 53 | 58 | 53 | 13 | 14 | 15 | 14 |
| Example 9 | −3.1 | −3.5 | −4.0 | −3.5 | 62 | 68 | 77 | 69 | 6.5 | 7.1 | 7.7 | 7.1 |
| Example 10 | −3.1 | −3.5 | −4.0 | −3.5 | 28 | 33 | 38 | 32 | 12 | 13 | 15 | 14 |
| Example 11 | −3.1 | −3.5 | −4.0 | −3.5 | 48 | 53 | 58 | 53 | — | — | — | — |
| Example 12 | −3.1 | −3.5 | −4.0 | −3.5 | 40 | 44 | 48 | 43 | — | — | — | — |
| Example 13 | −3.1 | −3.5 | −4.0 | −3.5 | 48 | 53 | 58 | 53 | — | — | — | — |
| Example 14 | −2.0 | −9.0 | −17.0 | 9.0 | 25 | 31 | 38 | 31 | — | — | — | — |
| Example 15 | −3.1 | −3.5 | −4.0 | −3.5 | 40 | 44 | 50 | 46 | — | — | — | — |
| Example 16 | −3.1 | −3.5 | −4.0 | −3.5 | 45 | 50 | 55 | 50 | — | — | — | — |
| Example 17 | −2.0 | 9.0 | 17.0 | 9.0 | 43 | 47 | 53 | 48 | — | — | — | — |
| Example 18 | −3.1 | −3.5 | −4.0 | −3.5 | 30 | 33 | 38 | 35 | — | — | — | — |
| Example 19 | −2.5 | −2.9 | −3.3 | −2.9 | 35 | 40 | 45 | 40 | 3.8 | 4.4 | 5.3 | 4.5 |
| Example 20 | −2.5 | −2.9 | −3.3 | −2.9 | 25 | 29 | 35 | 31 | — | — | — | — |
| Example 21 | −3.1 | −3.5 | −4.0 | −3.5 | 47 | 52 | 57 | 53 | — | — | — | — |
| Example 22 | −2.2 | −2.6 | −3.2 | −2.7 | 27 | 32 | 38 | 33 | — | — | — | — |
| Comp. Ex. 6 | −3.1 | −3.5 | −4.0 | −3.5 | — | — | — | — | — | — | — | — |
| Comp. Ex. 7 | −2.5 | −2.9 | −3.3 | −2.9 | — | — | — | — | — | — | — | — |
| Comp. Ex. 8 | −3.1 | −3.5 | −4.0 | −3.5 | −3.0 | −3.4 | −3.9 | −3.4 | — | — | — | — |
| Comp. Ex. 9 | — | — | — | — | | 25 | | | — | — | — | — |
| Comp. Ex. 10 | — | — | — | — | | 31 | | | — | — | — | — |

Example 23

A thermotropic liquid crystal polyester containing 27 mol % of units from 6-hydroxy-2-naphthoic acid and 73 mol % of units from p-hydroxybenzoic acid was melt extruded, producing a film having tensile strengths in MD and TD of 36 kg/mm² and 35 kg/mm², respectively, moduli of elasticity in tension in MD and TD of 1125 kg/mm² and 1055 kg/mm², respectively, and thermal expansion coefficients in MD and TD of −14 ppm/°C. and −13 ppm/°C., respectively. The film had a melting point of 282° C. Observation with a microscope of the cross-section in the thickness direction of the film revealed that the film had a laminar structure.

The film was then placed between two pieces of ED copper foil, with the ED side facing the film; then this laminate was put through a double belt loop press and heated above the melting point of the film at an average temperature of 292° C., for 10 seconds, followed by cooling. The copper was then etched off with an aqueous ferric chloride solution.

The heat treated film was tested for tensile strength, modulus of elasticity under tension, thermal expansion coefficient, and resistance to intra-layer delamination. The cross-section in the thickness direction of the film was observed with a microscope. The results obtained are shown in Table 13.

Comparative Example 11

Example 23 was repeated except that the heat treatment was changed to 260° C. for 4.3 minutes, i.e., no melt treatment. The results of evaluation on the thus treated film are shown in Table 13.

TABLE 13

|  | Tensile Strength (kg/mm²) | | Modulus of elasticity in tension (kg/mm²) | | Thermal expansion coeff. (ppm/°C.) | | Microscopic observation of thickness cross-section | Intra-layer peeling strength after solder float* (kg/cm) |
| --- | --- | --- | --- | --- | --- | --- | --- | --- |
|  | MD | TD | MD | TD | MD | TD | | |
| Film to be treated | 36 | 35 | 1125 | 1055 | −14 | −13 | Laminar Structure | — |
| Example 23 | 17 | 17 | 345 | 323 | 44 | 13 | Uniform Structure | 1.2 |
| Comparative Example 11 | 30 | 26 | 598 | 626 | −5 | −4 | Laminar Structure | 0.1 |

*Measured in accordance with Method III of (7), IPC - TM - 650 # 2.4.9 Method C modified to 260° C. solder dip.

It is understood from Table 13 that sufficient heat-melt treatment can provide films according to the present invention having a positive thermal expansion coefficient and a tensile strength of at least 5 kg/mm², and having a uniform structure throughout the thickness direction and excellent resistance to intra-layer delamination. It is also understood that, on the other hand, insufficient heat-melt treatment may produce films that still have a negative thermal expansion coefficient and a laminar structure, and, therefore, insufficient resistance to intra-layer delamination.

As is apparent from the above Examples, the process of the present invention can produce films having excellent resistance to intra-layer delamination, as well as high tensile strength and elongation. Furthermore, the films obtained by the process of the present invention also have excellent resistance to abrasion, good dimensional stability when heated and excellent resistance to folding, as well as a moderate thermal expansion coefficient comparable to that of other materials.

Numerous modifications and variations of the present invention will occur to those skilled in the art in light of the above description thereof. The present invention is not limited to the embodiments described herein, but encompasses all the subject matter within the scope of the appended claims.

What is claimed is:

1. A process for treating a film made by extrusion molding a polymer capable of forming an optically anisoptropic melt phase, which comprises the steps of:

heating said film, while contacting at least one surface of said film with a supporting body, to a temperature sufficient to melt said polymer;

cooling the melted polymer to form a solidified polymer layer; and separating said solidified polymer layer from said supporting body.

2. The process according to claim 1, wherein said supporting body comprises a metal foil, and wherein said separating step is accomplished by dissolving said metal foil layer off of said polymer layer.

3. The process according to claim 1, wherein said solidified polymer layer is separated from said supporting body by peeling.

4. The process according to claim 1 further comprising the step of:

heating said solidified polymer layer, either before or after separation thereof from said supporting body, at a temperature in the range of from a minimum of about 150° C. to a maximum of about 30° C. below the thermal deformation temperature that said film had before undergoing said heating step.

* * * * *